April 26, 1966

R. PEACOCK 3,247,658

FRUIT HARVESTER

Filed Aug. 30, 1963

INVENTOR.
ROBERT PEACOCK
BY
B. B. Olive
ATTORNEY

April 26, 1966 R. PEACOCK 3,247,658
FRUIT HARVESTER
Filed Aug. 30, 1963 5 Sheets-Sheet 2

INVENTOR.
ROBERT PEACOCK
BY
*B. B. Olive*
ATTORNEY

INVENTOR.
ROBERT PEACOCK
BY
B. B. Olive
ATTORNEY

April 26, 1966  R. PEACOCK  3,247,658
FRUIT HARVESTER
Filed Aug. 30, 1963  5 Sheets-Sheet 4
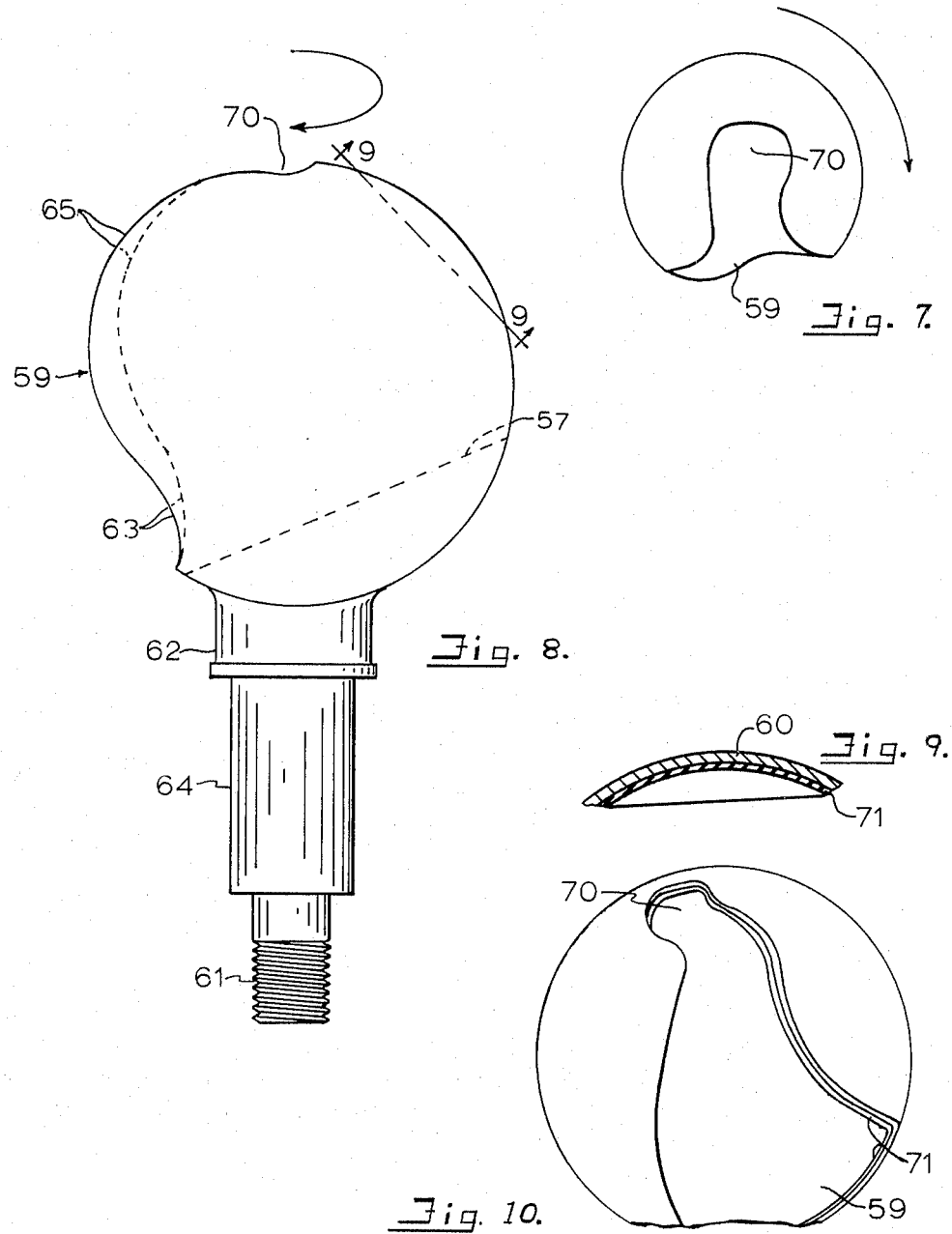
INVENTOR.
ROBERT PEACOCK
BY
*B. B. Olive*
ATTORNEY April 26, 1966 R. PEACOCK 3,247,658
FRUIT HARVESTER
Filed Aug. 30, 1963 5 Sheets-Sheet 5

INVENTOR.
ROBERT PEACOCK
BY B. B. Olive
ATTORNEY

United States Patent Office 3,247,658
Patented Apr. 26, 1966

3,247,658
FRUIT HARVESTER
Robert Peacock, St. Petersburg, Fla., assignor to Lischka Manufacturing Company, Inc., St. Petersburg, Fla., a corporation of Florida
Filed Aug. 30, 1963, Ser. No. 305,658
14 Claims. (Cl. 56—328)

This invention relates generally to fruit harvesters and, more particularly, to a unique fruit harvester which plucks the fruit mechanically at a high rate without damaging the tree and the immature fruit.

Heretofore, a great variety of harvesting devices have been proposed for mechanically removing or plucking fruit from the tree and then conveying the plucked fruit to a field crate or other container. In recent years, a number of mechanical picking devices have been proposed for the purpose of reducing the harvesting time by picking the fruit at a faster rate. However, these devices have generally caused a considerable amount of damage to the fruit and/or to the tree and the immature fruit and blooms. Moreover, many of the devices previously proposed have involved relatively complex structures which are difficult and cumbersome to operate.

It is, therefore, the main object of the present invention to provide a unique fruit harvesting device which picks the fruit mechanically at a relatively high rate with substantially no damage to the fruit, the trees, or the new fruit and blooms.

It is another object of the invention to provide such a device which greatly reduces the physical effort required for the picking operation and thereby increases production by lessening human fatigue.

It is a further object to provide such a device which can be readily synchronized with ground transporting vehicles.

A still further object is to provide such a device which can be operated very efficiently with an extremely small amount of power.

Other aims and advantages of the invention will be apparent from the following description and appended claims.

In the drawings:

FIGS. 7 and 8 are plan and elevation views, respectively, of a picking cup assembly in the apparatus of FIG. 1;

FIG. 9 is a cross section of a portion of the picking cup taken along line 9—9 in FIG. 8;

FIG. 10 is an isometric view of the picking cup showing the cloven hoof design of the cup opening;

Figure 1:
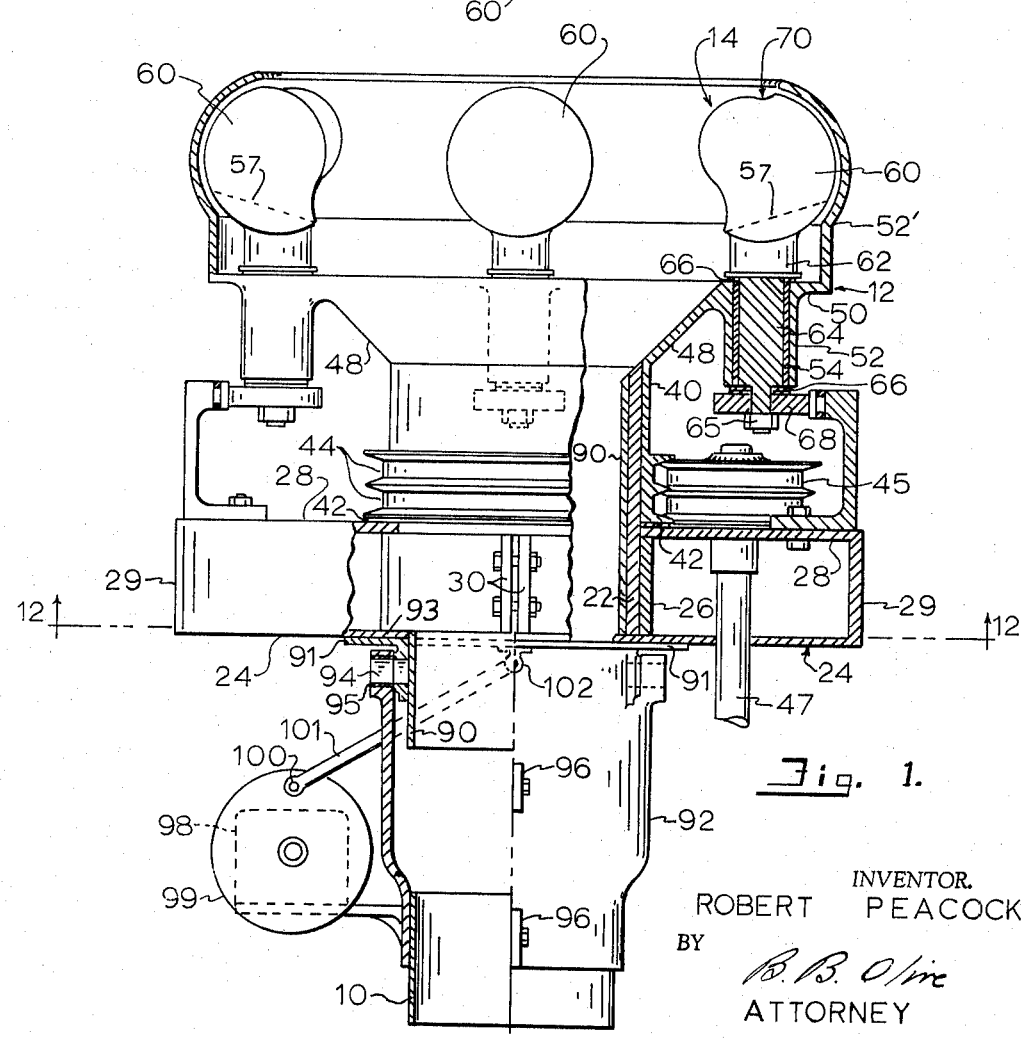
FIG. 1 is an elevation view, partially in section, of a preferred embodiment of the present invention.
Figure 11:
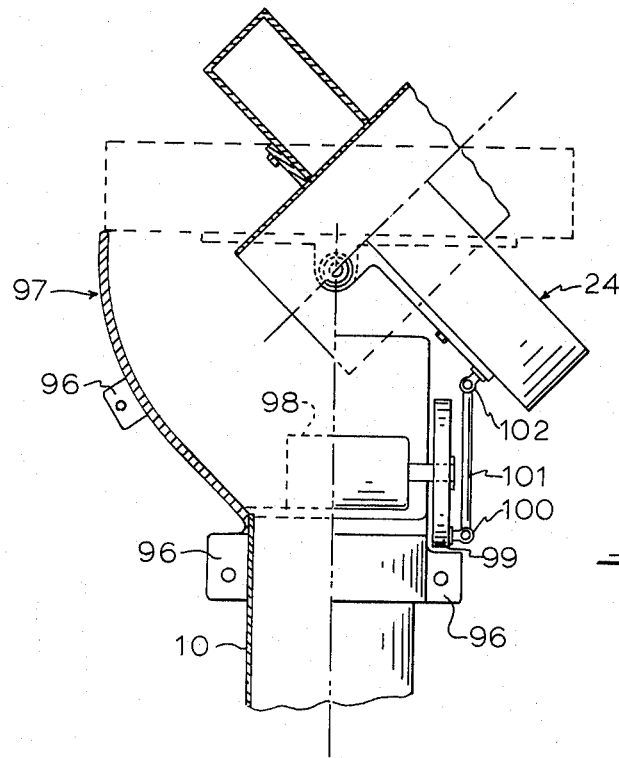
Figure 12:
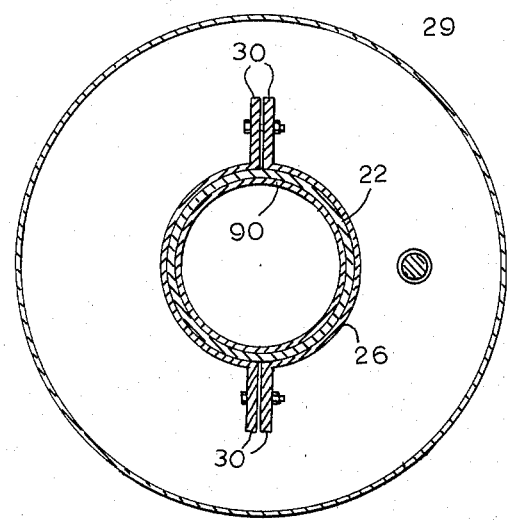

FIG. 11 is an elevation view on a reduced scale of the mounting assembly shown in FIG. 1 rotated 90° to show the funnel 92 and with the picking head 12 in a tilted position; and FIG. 12 is a bottom plan view taken along line 11—11 in FIG. 1 to show the clamping bracket 24.

In accordance with the pesent invention, there is provided a method and apparatus for picking tree fruit by moving the fruit away from its original point of suspension so as to subject the stem of the fruit to tension while simultaneously rotating the fruit around its own axis so as to subject the stem thereof to torsion. In a preferred embodiment of the invention, there is provided a fruit harvesting apparatus which comprises chute means having an open upper end adapted to move the fruit away from its original point of suspension; means for rotating the rotatable supporting means; a plurality of picking means rotatably mounted on the rotatable supporting means and adapted to engage the fruit; and means for imparting rotational movement to the picking means, whereby the stem of the fruit is simultaneously subjected to tension from the movement of the supporting means and torsion from the movement of the picking means.

By providing a rotating supporting means with a plurality of picking means which are revolved internally as the supporting means is rotated, the apparatus of this invention picks the fruit rapidly and efficiently without damaging the picked fruit and with very little physical effort by the operator. Moreover, in the preferred embodiment of the invention, the top of each picking cup is provided with a tapered slot which permits the foliage and immature fruit to pass through the picking cup without being damaged. Furthermore, this apparatus requires a very low power input and can be readily synchronized with ground transport vehicles.

The invention will now be described in more detail by referring to the preferred embodiment illustrated in the drawings.

Figure 2:
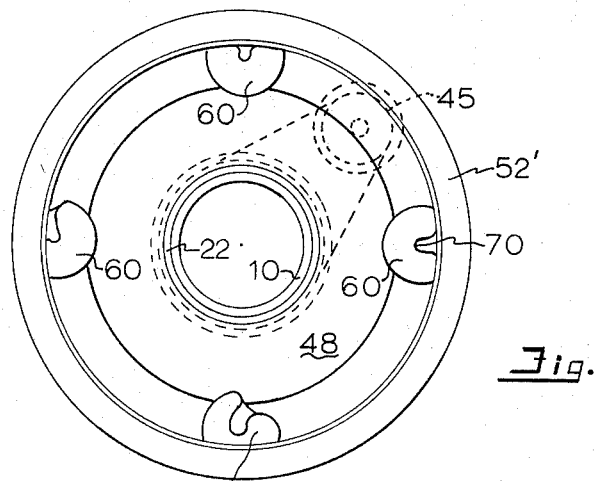
FIG. 2 is a plan view, on a reduced scale, of the apparatus of FIG. 1.

Referring first to FIGS. 1 and 2, the illustrated apparatus generally comprises a rigid tubular chute 10, an annular head 12 rotatably and pivotally mounted on a mounting assembly on the upper end of the chute 10, and a plurality of picking cup assemblies 14 rotatably mounted on the annular head 12.

Figure 3:
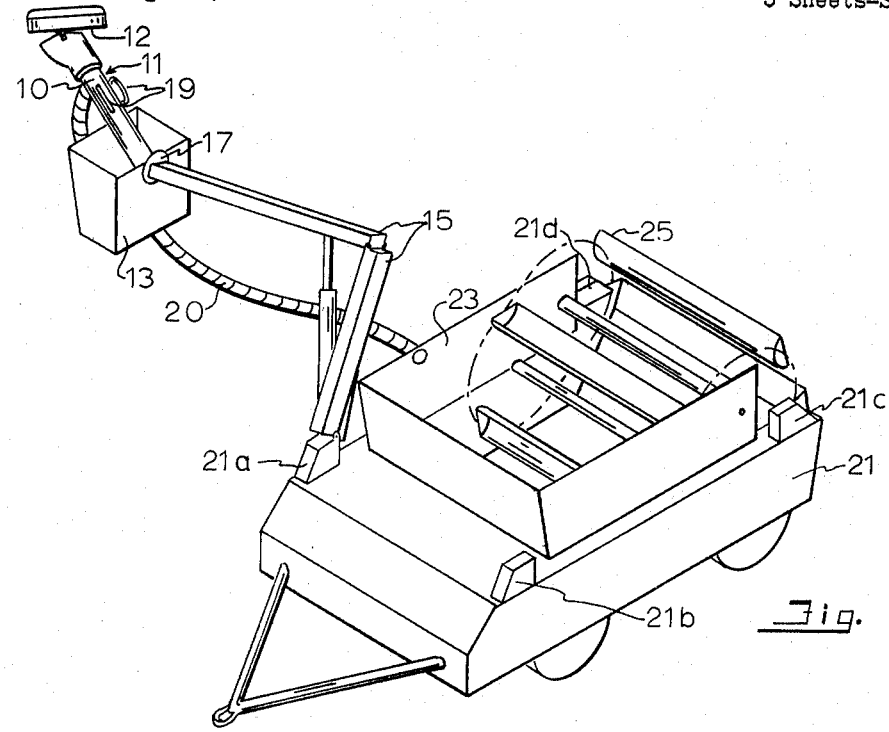
FIG. 3 is a perspective view of the apparatus of FIG. 1 mounted on a torsion bar assembly connected to a ground transporting vehicle.

As shown in FIG. 3, the lower end of the rigid chute 10 is pivotally connected to a torsion bar assembly 15 by means of a conventional universal joint 17. The torsion bar assembly 15 is mounted on a corner pedestal 21a of an appropriate ground transport vehicle 21. Of course, any other suitable elevating mechanism could be substituted for the torsion bar assembly 15. A basket 13 is mounted below the lower portion of the chute 10 to provide supporting means for the operator (not shown), and a pair of handles 19 is secured to the chute 10 so that the operator can manipulate the entire harvester 11 in an arcuate path about the universal joint 17. Although only one torsion bar assembly and harvester is shown in FIG. 3, it will be understood that similar assemblies and harvesters may be mounted on the other corner pedestals 21b, 21c, and 21d.

At some point below the picker head 12, the chute 10 is provided with a circular side opening through which a flexible tube 20 (see FIG. 3) is inserted and telescoped upwardly a short distance within the chute 10. The tube 20 may be secured to the rigid chute 10 by means of rivets, bolts, or any other suitable fastening means. From the chute 10, the flexible tube 20 extends downwardly to a hopper 23 on the vehicle 21. A bucket conveyor system is also mounted on the vehicle 21 for transporting the fruit from the hopper 23 to a suitable cart or field crates. Of course, the inside diameters of both the rigid chute 10 and the flexible tube 20 must be sufficiently large to permit the particular fruit being picked to pass freely and rapidly therethrough, and both the chute 10 and the tube 20 should have interior surfaces designed to avoid damage to the fruit. Also, since the chute 10 in effect acts as a boom for the picker head, it must be sufficiently strong and rigid to support the rotatable head 12, the picking cup assemblies 14, and the various elements associated therewith as the harvester is pivoted to various operating positions.

As shown in FIG. 1, the annular head 12 is mounted on the upper end of the chute 10 by means of a mounting assembly comprising a clamping bracket 24, a receiving tube 90, a swivel bracket 91, and a receiving funnel 92. An antifriction bearing sleeve 22, or a series of standard roller bearings, is secured to the outer surface of the upper portion of the receiving tube 90 by means of the clamping bracket 24. The clamping bracket 24 comprises a pair of semicircular clamping members 26 which fit around the bearing sleeve 22 (see FIG. 12), an annular supporting plate 28 extending radially outwardly from the upper edges of the clamping members 26, a depending skirt 29 on the periphery of the plate 28, and an annular base plate 93. The two clamping members 26 are provided with apertured flanges 30 which are bolted together to draw the clamping members 26 tightly together against the bearing sleeve 22.

Fastened to the underside of the base plate 93 is the swivel bracket 91, which has two protruding axles 94. The fruit receiving funnel 92 is provided with two holes lined with antifriction bearings 95 to receive the axles 94. The funnel 92 is formed in two pieces which are drawn tightly together around the upper portion of the chute 10 by bolting together several flanges 96 on the two pieces. The main body portion of the funnel 92 protrudes outwardly on one side above the end of the chute 10 to form a semicircular funnel portion 97, as shown in FIG. 11.

It will be recognized at this point that the funnel 92 forms a positive connection between the receiving tube 90 and the chute 10 while at the same time acting as a funnel permitting unrestricted flow of the fruit and enabling the head 12 to be tilted over a wide angle range. Thus, the head 12 can be presented horizontally to the underside of vertically hanging fruit even though the chute 10 is moved through a wide range of angles. The swivelling action of the head 12 is motivated by means of an electric motor 98 which transmits a rotary movement to a crank 99. The rotary movement is converted to a reciprocal movement to swivel the head 12 by means of a first universal joint 100, connecting rod 101, and a second universal joint 102. Of course, the electric motor 98 may be replaced with hydraulic cylinders or air cylinders and lever mechanisms or any other suitable driving means.

Figure 6:
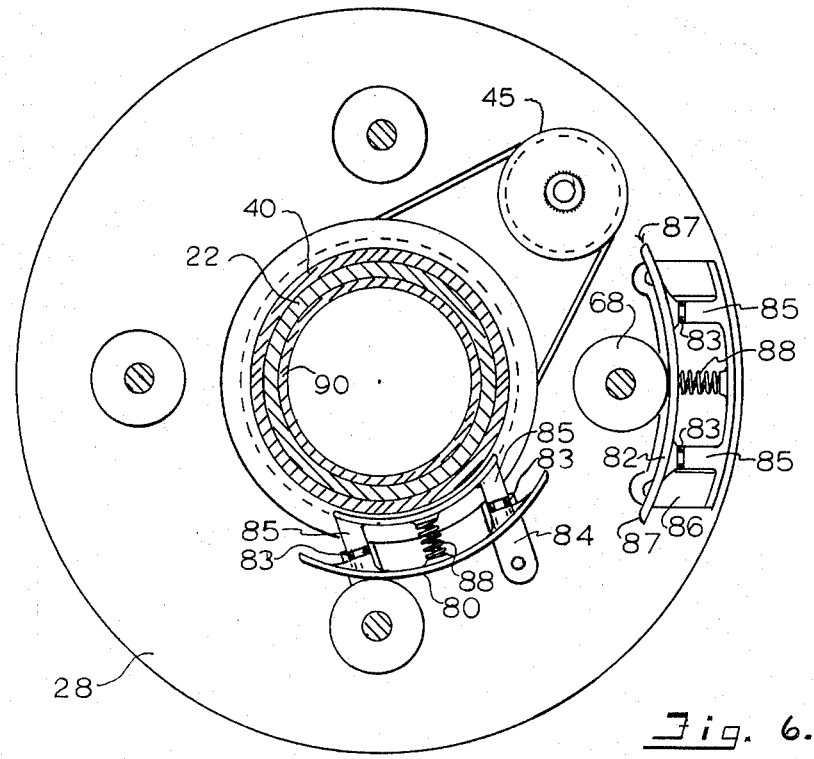
FIG. 6 is a plan view taken along line 6—6 in FIGS. 4 and 5.

Still referring to FIG. 1, the annular head 12 has a vertical sleeve portion 40 which fits down over the bearing sleeve 22 and rests on a bearing ring 42 on top of a stationary clamping members 26. The sleeve portion 40 is provided with two V-belt grooves 44 which are aligned with similar grooves on a drive pulley 45. The drive pulley 45 is mounted on the supporting member 28 and is driven through a flexible drive cable 47 or universal drive leading from a conventional power source (not shown) housed in the ground transport vehicle 21. The V-belt is not shown in FIG. 1, but is illustrated in FIGS. 2 and 6.

Above the sleeve portion 40, the head 12 is provided with an upwardly and radially outwardly sloping funnel portion 48 to guide the picked fruit into the receiving tube 90. The surface of the funnel portion 48 should be as smooth as possible to avoid damage to the fruit and may even be lined with a resilient coating of rubber or the like. Extending outwardly from the upper edge of the funnel portion 48 is a horizontal annular shelf 50 provided with four equally spaced apertures opening into four integral depending circular sockets 52 adapted to receive the picking cup assemblies 14. Beyond the shelf 50, the head 12 terminates with a vertical rim 52', the upper portion of the rim being curved to conform to the shape of the picking cups 60 of the picking cup assemblies 14.

Still referring to FIGS. 1 and 2, the four picking cup assemblies 14 are seated in the four equally spaced sockets 52 depending from the shelf 50. The inner surfaces of the sockets 52 are lined with antifriction bearing sleeves 54 so that the picking cup assemblies 14 can be rotated therein. The details of the picking cup assemblies 14 are shown in FIGS. 7, 8 and 9. Each assembly 14 comprises a spherical picking cup 60 having its main opening 59 extending substantially vertically on a side portion of the cup, a flanged base portion 62, and a stepped stem 64 having a threaded end portion 61. In order to avoid damage to the fruit while it is in contact with the picking cups 60, the interior of each cup 60 can be lined with a layer 71 of smooth rubber or plastic, as shown in FIG. 9. Of course, the main side opening must be wider than the fruit to be picked. The interiors of the picking cups 60 are provided with inclined lower surfaces 57 (see FIGS. 1 and 8) tapering downwardly from the rear wall of the cup to the lower edge of the main opening 59 to impel the fruit more quickly into the receiving tube 90.

As shown in the elevation view in FIG. 8, the vertical edges of the side opening of the cup 60 are provided with a concave lower portion 63 and a convex upper portion 65 to assist in trapping the fruit and drawing it into the cup 60. Also, the convex upper portion 65 of one of the edges protrudes farther than the convex upper portion of the other edge (see FIGS. 1 and 8) to facilitate both the pick-up of the unplucked fruit and the release of the plucked fruit. Extending upwardly from the side opening of the cup 60 and across a major portion of the top of the cup 60 is a U-shaped top opening or slot 70 which is narrower than the fruit to be picked. This slot 70 provides a channel through which the stem of the fruit can pass as the fruit is being drawn into the cup 60, thus further facilitating the pick-up of the fruit and causing a direct pressure to be exerted on the fruit button or calyx. The combination of the side opening and the top slot 70 in the cup 60 forms a single continuous cloven hoof-shaped opening which permits the immature fruit, branches, leaves, and blossoms to pass through the picking cup unharmed, while retaining the mature fruit within the cup.

Referring back to FIG. 1, each picking cup assembly 14 is rotatably mounted on the head 12 with the flanged base portion 62 resting on a thrust washer 66 on the shelf 50 and with the stem 64 extending down into the socket 52 in sliding contact with the bearing sleeve 54 therein. A friction pulley 68 is mounted on the narrow portion of the stem 64 below the socket 52, and a locking nut 65 is threaded onto the lower end of the stem 64 to hold the pulley 68 and the entire picking cup assembly firmly in place. A second thrust washer 66 is provided between the pulley 68 and the lower end of the socket 52.

The picking cup assemblies 14 are oscillated rotationally within the bearing sleeves 54 by means of stationary friction plates which act as idler means to actuate the friction pulley 68 from the rotation of the head 12. This friction driving system is shown generally in FIG. 1 and in more detail in FIGS. 4 through 6. All elements above the annular head 12 have been omitted in FIGS. 4 and 5, since they have already been shown in FIG. 1. Referring first to FIG. 6, a plurality of friction plates 80 and 82 are mounted by means of brackets 84 and 86 on the annular supporting member 28 of the stationary clamping bracket 24. The friction plates 80 and 82 are arranged in two circular series (only one plate of each series is shown in FIG. 6) at regularly spaced intervals, with the plates of each circle being staggered with relation to the plates of the other circle so that none of the plates in the two circles are directly opposed to each other in the radial direction. The friction plates 80 of the inner circle are positioned to engage the radially innermost points of the drive pulleys 68, while the friction plates 82 of the outer circle are positioned to engage the radially outermost points of the drive pulleys 68. The circumferential spacing of the two circles of plates 80 and 82 must be such that the pulley 68 is never in contact with an inner plate 80 and an outer plate 82 at the same time, and the length of each of the plates is preferably equal to the circumference of the pulley 68 so that each plate drives the pulley through one complete revolution. Thus, as the annular head 12 is rotated about its axis, each pulley 68 engages a friction plate in one circle which drives the pulley through one complete revolution; the pulley 68 then hesitates and engages a friction plate in the other circle which drives the pulley through one complete revolution in the opposite direction. In other words, each pulley 68 oscillates rotationally through alternate clockwise and counterclockwise revolutions, with a slight hesitation between each change of direction.

Figure 4:
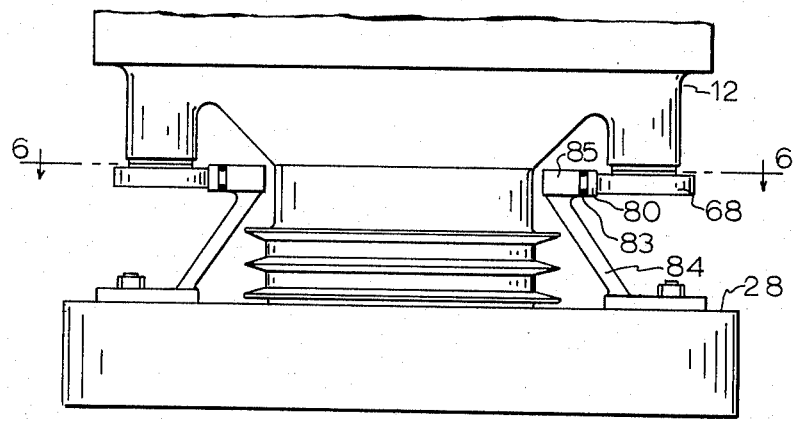
FIGS. 4 and 5 are elevation views from different circumferential positions of the apparatus of FIG. 1 showing the friction driving system for the picking cup assemblies.
Figure 5:
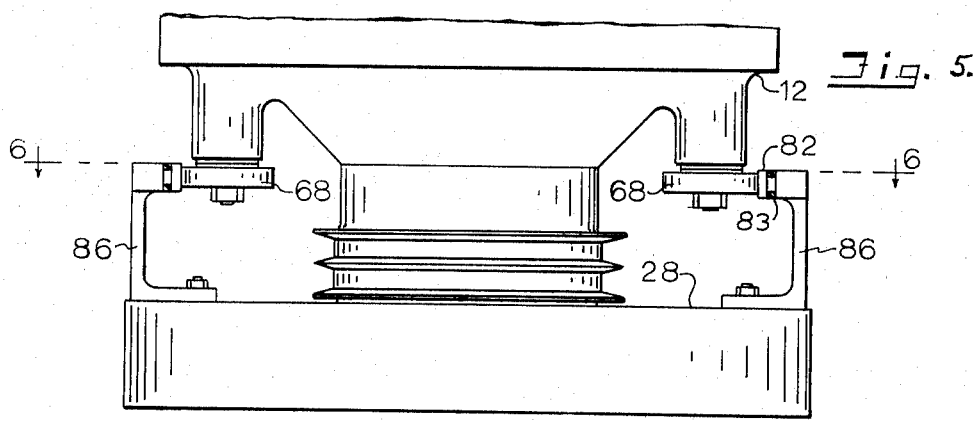

As illustrated in FIGS. 4 and 5, the friction plates 80 and 82 are provided with small slide rods 83 which fit into sockets 85 on the brackets 84 and 86, and a small compression spring 88 is connected from the center of each plate 80 or 82 to its supporting bracket 84 or 86. Each friction plate is tapered away from the pulleys 68 at both ends, as at 87 in FIG. 6, and is positioned to protrude slightly beyond the pulley surface to be engaged. Thus, as the pulley 68 engages each friction plate 80 or 82, the pulley forces the plate a small distance back into its supporting sockets and slightly compresses the spring 88, thereby effecting and maintaining tight frictional engagement between the pulley 68 and the friction plate 80 or 82.

Operation

In operation the movement of the harvester 11 to the fruit is controlled by an operator in the basket 13. The height of the basket 13 is controlled by the torsion bar assembly 15, while the operator in the basket manually pivots the harvester 11 around the universal joint 17 by means of the handles 19 on the chute 10. As the operator pivots the harvester around the universal joint 17, he operates a foot switch controlling the electric motor 98 to swivel the harvester head 12 around the axles 94 to maintain it in a horizontal position. Thus, the operator manipulates the harvester 11 so that the entire harvesting head is presented to the fruit from below with the harvesting head as horizontal as possible so that the fruit hangs loosely into the cavity formed by the annular rim 52'.

As the harvester 11 approaches the fruit, the annular head 12 is continuously rotated around the upper end of the tubular chute 10 by means of the V-belt drive shown in FIGS. 1 and 2. Concurrently with the rotation of the head 12, each of the picking cup assemblies 14 is oscillated rotationally within the head 12 by means of the aforedescribed friction pulleys 68 and friction plates 80 and 82. As the open side of each picking cup 60 is turned toward the center of the head 12, the fruit is engaged and drawn into the revolving cup 60 with the stem of the fruit extending upwardly through the U-shaped top opening 70. The operators moves the harvester 11 slowly back and forth in a substantially horizontal transverse direction to ensure that the fruit is engaged and held by the revolving cups 60. As mentioned above, the continuous cloven hoof opening formed by the combination of the side opening and the U-shaped top opening permits immature fruit, branches, leaves, and blossoms to pass through the picking cups unharmed, while retaining the mature fruit within the cups.

As the fruit enters the picking cup 60, the fruit is continuously moved away from its point of entrance by the rotational movement of the head 12 around the chute 10, which forces the fruit firmly against the inner surface of the cup 60 and exerts a direct pulling force on the fruit button or calyx. Because the frictional contact area of the fruit in the bowl 60 is greater than that of the stem holding the fruit, the fruit is also revolved within the head 12 by the rotational oscillation of the picking cup assembly 14. Thus, the fruit button or calyx is simultaneously subjected to tension from the movement of the head 12 away from the point of entrance and to torsion from the rotational movement of the picking cup assembly 14 within the head 12. This combination of forces plucks the fruit from the tree rapidly and efficiently with substantially no damage to the fruit or the tree. As the open side of the picking cup 60 returns to face the center of the head 12 again, gravitational forces cause the fruit to fall out of the picking cup 60, down the funnel portion 48 of the head 12, into the receiving tube 90, down the funnel 92, and into the tubular chute 10. As mentioned above, the tapered inside lower surface 57 of the picking cup 60 impels the fruit more quickly into the receiving tube 90. The picking cup then engages another fruit, and the cycle is repeated. The speed of rotation of the head 12 and the speed ratio between the head 12 and the picking cup assemblies 14 can vary over wide ranges, depending on the density and the type of fruit to be picked, the nature of the tree, and the like.

While one particular embodiment of the present invention has been illustrated and described in detail herein, it will be apparent that the same is susceptible of numerous modifications within the scope of the invention. For example, although the rotatable head 12 has been described with particular reference to a V-belt drive mechanism, the head could be driven by a chain and sprocket mechanism, a gear mechanism, or any other suitable driving means. Similarly, the friction drive system for the picker cups 60 could be replaced with a rack and pinion system. Moreover, although the picker cups have been described as oscillating rotationally, an effective picking action can also be achieved by simply rotating the picker cups in a planetary motion within the rotating head. In this case, a continuous annular friction plate would be mounted to engage either the innermost or outermost points of the pulleys 68, and the more protruding edge of the main cup opening should lead into the rotation of the cup, with the less protruding edge leading out of the rotation of the cup. Also, it will be apparent that any number of picking cups may be employed in the apparatus of the invention. In still another modification, the annular head 12 could be provided with a fruit-retaining member adjacent each picking cup rather than a continuous peripheral rim. If desired, the annular head 12 could be replaced with any other suitable rotatable supporting means, such as a plurality of radial arms or ribs supporting the picking cups. In this case, the fruit-retaining members would be mounted on the ends of the arms or ribs.

What is claimed is:

1. A fruit harvesting apparatus for mechanically picking tree fruit, which apparatus comprises chute means having an open upper end adapted to receive the picked fruit; rotatable supporting means mounted above the upper end of said chute means and adapted to move the fruit away from its original point of suspension; means for rotating said rotatable supporting means; a plurality of picking means rotatably mounted on said rotatable supporting means and adapted to engage said fruit; and means for imparting rotational movement to said picking means, whereby the stem of said fruit is simultaneously subjected to tension from the movement of said supporting means and torsion from the movement of said picking means.

2. A fruit harvesting apparatus for mechanically picking tree fruit, which apparatus comprises:
   (a) a tubular chute having an open upper end adapted to receive the picked fruit;
   (b) an annular head rotatably mounted above the upper end of said chute;
   (c) means for rotating said annular head around said tubular chute;
   (d) a plurality of picking cups rotatably mounted on said annular head, said picking cups being adapted to engage the fruit to be picked and to entrap said fruit within said cups as said cups are moved rotationally within said head, said annular head including means on the periphery thereof adjacent each of said picking cups to retain picked fruit within said annular head;

(e) and means for imparting rotational movement to said picking cups.

3. A fruit harvesting apparatus for mechanically picking tree fruit, which apparatus comprises:

(a) a tubular chute having an open upper end adapted to receive the picked fruit;

(b) an annular head rotatably mounted above the upper end of said chute, said annular head having an upwardly extending peripheral rim forming a cavity for receiving the fruit to be picked above the open upper end of said chute;

(c) means for rotating said annular head around said tubular chute;

(d) a plurality of picking cups rotatably mounted on said annular head within said peripheral rim, said picking cups being adapted to engage the fruit to be picked within said cavity and to entrap said fruit within said cups as said cups are moved rotationally within said head;

(e) and means for imparting rotational movement to said picking cups.

4. The apparatus of claim 3 wherein said peripheral rim is in closely spaced relationship with said rotatable picking cups so as to prevent the release of said fruit from said picking cups onto the radially outer portion of said head.

5. The apparatus of claim 3 wherein the main openings of said picking cups are on side portions on said cups.

6. The apparatus of claim 5 wherein said picking cups are provided with U-shaped top openings which are continuous with the main side openings, the U-shaped top openings being narrower than the fruit to be picked.

7. The apparatus of claim 5 wherein the side edges of said main openings of said picking cups are provided with a concave lower portion and a convex upper portion, with the convex upper portion on one edge protruding farther than the convex upper portion on the other edge.

8. The apparatus of claim 5 wherein the inside lower surfaces of said picking cups taper downwardly from the rear walls of the cups to the lower edges of the main side openings.

9. The apparatus of claim 3 wherein said means for imparting rotational movement to said picking cups includes driving means rigidly connected to said picker cups and idler means for actuating said driving means from the rotation of said annular head.

10. The apparatus of claim 9 wherein said driving means is a friction pulley and said idler means is at least one stationary friction plate.

11. The apparatus of claim 9 wherein said driving means is a friction pulley and said idler means is a plurality of friction plates arranged in two circular series, the plates in one circular series being positioned to engage the innermost surfaces of said pulleys and the plates in the other circular series being positioned to engage the outermost surfaces of said pulleys, the two circular series of plates being in staggered relationship.

12. A fruit harvesting apparatus for mechanically picking tree fruit, which apparatus comprises:

(a) a receiving tube having an open upper end adapted to receive the picked fruit;

(b) an annular head rotatably mounted on the periphery of the upper end of said receiving tube, said annular head having a funnel portion extending upwardly and radially outwardly from the end of said tube, said annular head also having an upwardly extending peripheral rim forming a circular cavity within said head for receiving the fruit to be picked above the open upper end of said tube;

(c) a plurality of picking cups rotatably mounted on said annular head within said peripheral rim, said picking cups being adapted to engage the fruit within said cavity and to entrap said fruit within said picking cups;

(d) means for rotating said annular head around said tubular chute;

(e) and means imparting rotational movement to said picking cups whereby the stems of the fruit entrapped in said picking cups are simultaneously subjected to tension from the rotation of said head and torsion from the rotational movement of said picking cups.

13. The apparatus of claim 12 wherein said receiving tube and said annular head are pivotally mounted on a receiving funnel by means of a swivel bracket, and said receiving funnel is attached to the upper end of a tubular chute.

14. A fruit harvesting apparatus for mechanically picking tree fruit, which apparatus comprises:

(a) a rigid tubular chute having an open upper end adapted to receive the picked fruit, said chute being connected to an elevating means by a universal joint, said chute also having a side opening therein;

(b) a flexible discharge tube extending through said side opening in said chute and being telescoped upwardly therein;

(c) an annular head rotatably mounted on the periphery of the upper end of said chute, said head having a funnel portion extending upwardly away from the end of said chute, a horizontal shelf portion extending outwardly from the upper periphery of said funnel portion and having a plurality of circular openings and sockets therein, and a vertical rim extending upwardly from the outer edge of said shelf portion;

(d) means for rotating said annular head around said tubular chute;

(e) a plurality of picking cup assemblies rotatably mounted in said circular openings and sockets in said shelf portion of said head, each of said picking cup assemblies having a cup portion with the main opening on the side of the cup and with a U-shaped slot extending from the side opening across a major portion of the top of the cup;

(f) and means for rotationally oscillating said picking cup assemblies as said annular head is rotated about said tubular chute.

References Cited by the Examiner

UNITED STATES PATENTS

| | | | |
|---|---|---|---|
| 2,698,508 | 1/1955 | Hollister | 56—332 |
| 2,775,088 | 12/1956 | Bullock | 56—332 |
| 2,968,141 | 1/1961 | McGaugh | 56—332 |
| 2,968,907 | 1/1961 | Bernheim et al. | 56—332 |
| 3,040,507 | 6/1962 | Lasswell | 56—328 |

ABRAHAM G. STONE, *Primary Examiner.*

RUSSELL R. KINSEY, *Examiner.*